US010314385B2

(12) United States Patent
Lim

(10) Patent No.: US 10,314,385 B2
(45) Date of Patent: Jun. 11, 2019

(54) APPARATUS FOR DETACHABLY ENGAGING WIRELESS HEADSETS

(71) Applicant: SALUTICA ALLIED SOLUTIONS SDN. BHD., Lahat, Ipoh (MY)

(72) Inventor: Chong Shyh Lim, Ipoh (MY)

(73) Assignee: SALUTICA ALLIED SOLUTIONS SDN. BHD., Perak (MY)

( * ) Notice: Subject to any disclaimer, the term of this patent is extended or adjusted under 35 U.S.C. 154(b) by 0 days.

(21) Appl. No.: 15/797,957

(22) Filed: Oct. 30, 2017

(65) Prior Publication Data
US 2019/0038009 A1 Feb. 7, 2019

(30) Foreign Application Priority Data
Aug. 3, 2017 (MY) .......................... PI 2017702856

(51) Int. Cl.
A45F 5/00 (2006.01)
H04R 7/00 (2006.01)
H04R 1/10 (2006.01)
H01R 13/62 (2006.01)
(Continued)

(52) U.S. Cl.
CPC ........... A45F 5/00 (2013.01); H01R 13/6205 (2013.01); H02J 7/0054 (2013.01); H02J 50/10 (2016.02); H04R 1/105 (2013.01); H04R 1/1016 (2013.01); H04R 1/1025 (2013.01); H04R 1/1041 (2013.01); A45F 2005/006 (2013.01); A45F 2200/0508 (2013.01); H04R 2420/07 (2013.01)

(58) Field of Classification Search
CPC .......................... H04R 1/1041; H04R 2420/07; H04R 1/1016; H04R 5/033; H04R 1/105; H04R 1/1091; H04R 1/1083; H04R 2201/107; H04R 2420/09; H04R 5/04; H04R 1/028; H04R 1/08; H04R 1/1025; H04R 1/1033; H04R 2420/03; H04R 2420/05; H04W 4/80; H04W 4/008; H04W 84/18; H04W 40/244; H04W 4/006; H04W 4/02; H04W 4/023; H04W 4/16; H04W 4/38; H04W 52/0274; H04W 64/00; H04W 76/14; H04W 8/005; H04W 8/22
USPC ..... 381/74, 380, 370, 312, 322, 328, 1, 309; 455/569.1
See application file for complete search history.

(56) References Cited

U.S. PATENT DOCUMENTS 7,416,099 B2 8/2008 deLeon et al.
7,650,007 B2 1/2010 Iuliis et al.
(Continued)

FOREIGN PATENT DOCUMENTS

EP 2 770 704 A1 8/2014

Primary Examiner — Lun-See Lao
(74) Attorney, Agent, or Firm — Masuvalley & Partners

(57) ABSTRACT

The present invention relates to an apparatus for detachably engaging wireless headsets (100), and more particularly to detachably engage with individual wireless earpiece modules. Accordingly, the apparatus includes: a) a neck-band or neck-loop module (110) with at least one battery pack (112); b) at least one earpiece holders (116); wherein the at least one earpiece holder (116) is adapted to be detachably engaged with at least one wireless earpiece module (120); and wherein the at least one battery pack (112) of the neck-band or neck-loop module (110) is configured to supply power to the at least one wireless earpiece module (120) via the at least one earpiece holder (116).

12 Claims, 4 Drawing Sheets

(51) Int. Cl.
*H02J 50/10* (2016.01)
*H02J 7/00* (2006.01)

(56) References Cited

U.S. PATENT DOCUMENTS

| | | | | |
|---|---|---|---|---|
| 7,844,311 | B2 * | 11/2010 | Kim | H04M 1/03 |
| | | | | 379/420.01 |
| 7,936,895 | B2 | 5/2011 | Wang et al. | |
| 9,445,175 | B2 * | 9/2016 | Seo | H04M 1/035 |
| 2005/0094839 | A1 * | 5/2005 | Gwee | H04R 1/1066 |
| | | | | 381/381 |
| 2015/0215440 | A1 * | 7/2015 | Park | H04W 4/008 |
| | | | | 455/569.1 |
| 2016/0337747 | A1 * | 11/2016 | Litovsky | H04R 5/0335 |
| 2016/0353193 | A1 * | 12/2016 | Williams | H04R 1/1033 |
| 2017/0264987 | A1 * | 9/2017 | Hong | H04R 1/1025 |

\* cited by examiner

APPARATUS FOR DETACHABLY ENGAGING WIRELESS HEADSETS

This application claims priority under 35 U.S.C. § 119 to Malaysian Patent Application No. PI 2017702856, filed Aug. 3, 2017, which is incorporated herein by reference in its entirety.

The present invention relates to an apparatus for detachably engaging wireless headsets, and more particularly to detachably engage with individual wireless earpiece modules.

BACKGROUND OF INVENTION

Wireless communications technology, such as Bluetooth, can be found in many of daily use electronic products such as headsets, smartphones, laptops and portable speakers. Earbud headphones are popular among users because they are generally relatively small and portable. Moreover, when a user is participating in various activities, earbud headphones and headsets allows for hands-free interaction with their devices. These headsets may be in the form of a mono headset (a single earpiece module) or a stereo headset (two earpiece modules).

A common and typical stereo headset may be in the form of a necklace, collar, neckband or neck-loop type. Particularly, stereo headsets with two earpiece modules, in which earphone cords connect both earpiece modules, may either be connected to the user's device via a wired connection or wirelessly. There are numerous configurations in which the earphone cords are arranged.

For example, U.S. Pat. No. 7,416,099 B2 discloses a neck strap for mobile electronic device. Accordingly, the neck strap for a mobile electronic device includes a flexible loop arrangeable around the neck of a user and a connector whereby said flexible loop is connectable to said mobile electronic device. Furthermore, one section of said flexible loop includes at least one securing element, whereby a cable is securable to said at least one section of the flexible loop. In this way, a cable, such as an earphone cable, may be secured to the flexible loop, thereby organizing the cable and reducing tangling of the cable. However, the headset is difficult to wear under clothing, both in the operational and non-operational position, i.e., when the earphones are taken off the ears.

U.S. Pat. No. 7,936,895 B2 discloses an earphone storage structure comprising a necklace, two fasteners formed in the two ends of the necklace respectively and a stopper formed in the necklace, wherein size of the fasteners is less than the size of the stopper and the size of the earphones. As such, the earphone may couple with the necklace with the fasteners fastening the earphones. Moreover, the earphone storage structure also provided with stopper and fasteners which may together determine the extendable distance of the earphones. However, the earphone storage structure has the limitations such as, for example, the cords have slack, and the structure is difficult to wear under clothing, and managing it through clothing is not convenient.

U.S. Pat. No. 7,650,007 B2 discloses a lanyard for handheld electronic device. Accordingly, the lanyard includes a neck cord having data carrying capabilities. The lanyard also includes a harness that physically holds and operatively couples the portable electronic device to the neck cord. When a portable electronic device is coupled to the harness, the portable electronic device can be worn around a neck and communicate with an input and/or output (I/O) device (e.g., earphones) operatively coupled to the data carrying cord. That is, the I/O device can send data through the neck cord to the portable electronic device and/or receive data being carried by the neck cord from the portable electronic device. The lanyard facilitates greater ease in wearing portable electronic devices and enables better approaches for managing wires between portable electronic devices and peripheral I/O devices. However, the lanyard does not eliminate sagging of cords in the operational position.

EP 2770704 A1 discloses a wireless headset including a body having an earphone coupling portion; a wireless module provided in the body and configured to wirelessly receive an audio signal from a mobile terminal; a speaker provided in the body; an earphone connected to the body via a cable and configured to be coupled to the body via an earphone coupling portion; a coupling sensor provided the body and configured to sense whether the earphone is coupled to the earphone coupling portion; and a controller configured to output the audio signal received from the mobile terminal via the speaker and not via the earphone, when the coupling sensor senses the earphone is coupled to the earphone coupling portion, and output the audio signal received from the mobile terminal via the earphone and not via the speaker, when the coupling sensor senses the earphone is separated from the earphone coupling portion.

The above iterations of the stereo wireless headset are normally worn by a user around their neck. This not only allows for stereo capabilities, but at the same time, the ergonomics of the neckband design allows the user to plainly wear the neckband without the need to store it away and access the earpiece modules as and when required. Furthermore, as both the earpiece modules are physically wired together, it reduces the probability of the user losing track of any one earpiece module. However, all these iterations suffer the same limitation, i.e., that the earpiece modules must be connected to each other via earphone cords in order for it to function.

Technological advancements have now however led to the release of "true" or "truly" wireless stereo headsets. Typically, such "truly" wireless stereo headsets have two earpiece modules that are each individually equipped with wireless capabilities and an internal power source. There are no earphone cords connecting both the earpiece modules. Each of the earpiece modules will typically be able to wirelessly communicate with the user's device and operate simultaneously in sync, thereby also allowing for hands-free interaction with the user's device but without the need of an earphone cord connecting the two earpiece modules.

However, such "truly" wireless stereo headsets also face limitations. Typically, as each of the earpiece modules are basically individual articles, there is the problem of stowing away the earpiece modules when not in use. In typical iterations in the industry at current, such "truly" wireless stereo headsets will come with a case to store both earpiece modules when not in use. The case will also act as the charging case for the earpiece modules whereby the charging case contains its own power source that can be used to charge the earpiece modules when they are stored in the case. However, this creates the problem of inconvenience when the user needs to use and store the earpiece modules as the user must always have the case in his possession and that the user will need to keep retrieving and storing the earpiece modules from and in the case every time the user wishes to use the earpiece modules. Additionally, once the earpiece modules are drained of power, or when they are being charged in the case, they cannot be used by the user until they are sufficiently charged and removed from the case. Furthermore, as the earpiece modules are not secured together, the probability of the user losing track of any one of the earpiece modules is significantly increased.

In view of these and other shortcomings, it is advantageous to provide an improved apparatus for detachably engaging wireless headsets, and more particularly to detachably engage with individual wireless earpiece modules. Accordingly, the apparatus is adapted to provide an easier and faster way to store or stow-away, or access the user's wireless earpiece modules, and it still be able to maintain its function while charging. The apparatus is also adapted to provide various wearing modes that are safe, reliable and economical reasonable for replacement, and yet convenient to use. The apparatus for detachably engaging wireless headsets of the present invention and its combination of elements thereof will be described and/or exemplified in the detailed description.

SUMMARY OF THE INVENTION

The present invention relates to an apparatus for detachably engaging wireless headsets, and more particularly to detachably engage with individual wireless earpiece modules. Accordingly, the apparatus includes: a) a neck-band or neck-loop module with at least one battery pack; b) at least one earpiece holder; wherein the at least one earpiece holder is adapted to be detachably engaged with at least one wireless earpiece module; and wherein the at least one battery pack of the neck-band or neck-loop module is configured to supply power to the at least one wireless earpiece module via the at least one earpiece holder.

By way of example, but not limitation, the neck-band or neck-loop module is made of flexible cord with built-in cable wires for connecting the at least one earpiece holder with the at least one battery pack.

In the preferred exemplary of the present invention, the at least one battery pack is adapted to be configured in at least three preferred modes, that is: i) to be configured at the centre of the neck-band or neck-loop as one mode, or ii) to be spitted into two for better battery weight distribution as another mode, or iii) to be placed inside the at least one earpiece holder as a further option.

It will be appreciated that there is a pair of earpiece holders that is preferably disposed at distal ends of the neck-band or neck-loop module.

Accordingly, the pair of earpiece holders can be detachably engaged with each other by a locking feature, such as by magnetic attraction, mechanical latches or connectors in order to form a secure loop around the user's neck.

By way of example, but not limitation, the at least one wireless earpiece module is detachably engaged with the at least one earpiece holder by a locking feature, such as by magnetic attraction, mechanical latches or connectors.

Accordingly, the at least one wireless earpiece module includes at least one "truly" wireless earpiece module with built-in battery, speaker, microphone and other wireless-enabled components.

In the preferred exemplary, a charging of the at least one wireless earpiece module is performed by the at least one battery pack configured at the neck-band or neck-loop module such that the at least one wireless earpiece module can still be accessible and functionable as it is adapted to be charged via the detachable engagement with the at least one earpiece holders of the neck-band or neck-loop module.

By way of example but not by the way of limitation, the charging of the at least one wireless earpiece module via the at least one earpiece holder can be achieved by various approaches, such as the implementation of charging or pogo pins, inductive charging, male and female connectors or other appropriate detachably connections.

It will be appreciated that there is a pair of wireless earpiece modules adapted to be detachably engaged with a pair of earpiece holders and each wireless earpiece module is an independent unit of left-hand and right-hand earpiece, such that data from a wireless-enabled device can be transmitted by radio frequency (RF) signals from the wireless-enabled device to the wireless earpiece module.

Accordingly, the wireless radio frequency (RF) transmission includes wireless protocols such as Wi-Fi, Bluetooth, or other protocols adapted for wireless transmission.

It will also be appreciated that the battery pack of the neck-band or neck-loop module is a rechargeable type such that the apparatus for detachably engaging wireless headsets can be recharged via a charging dock or directly through the power adaptor.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

Figure 1:
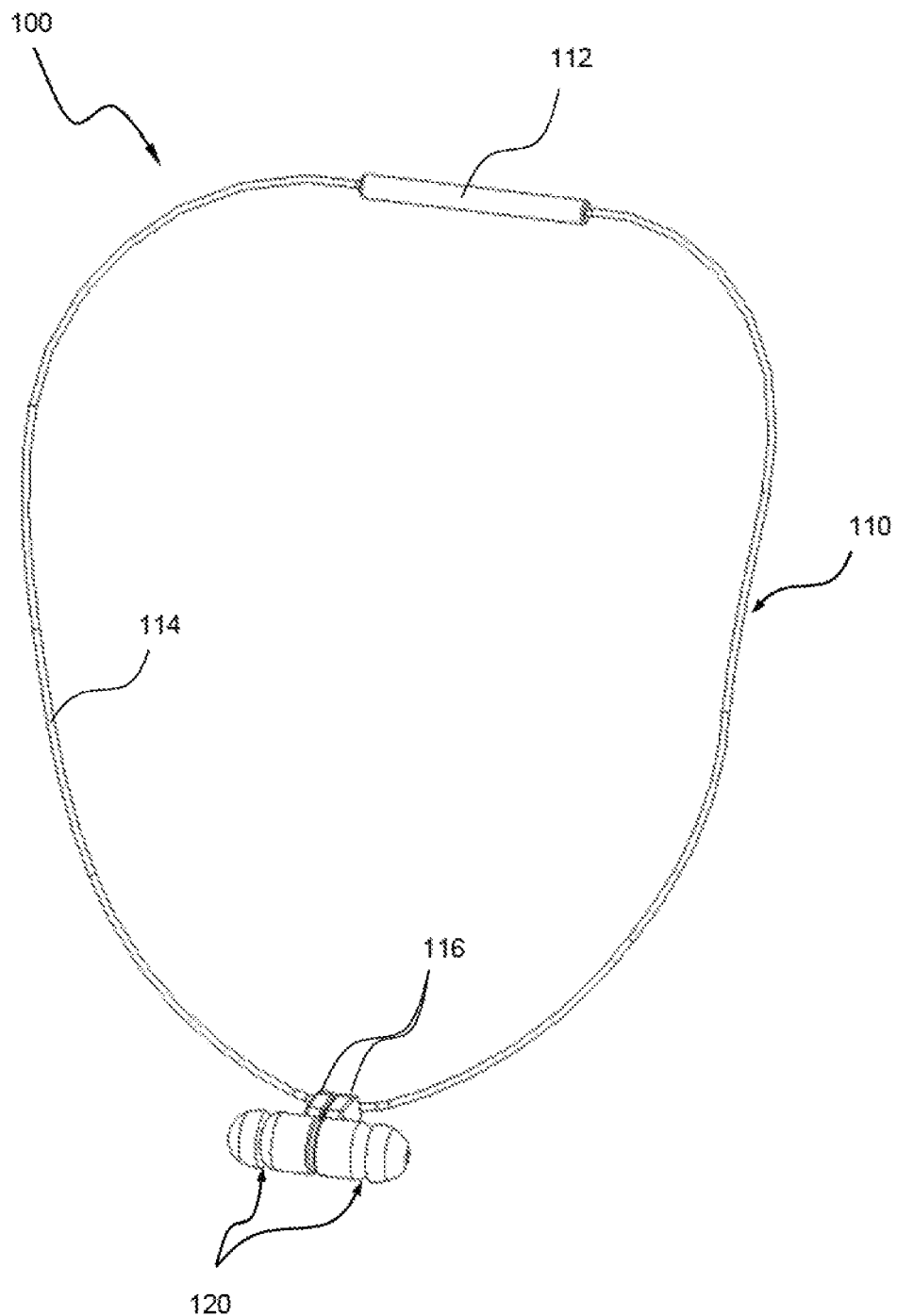
FIG. 1 shows an apparatus for detachably engaging wireless headsets in accordance with preferred exemplary of present invention.
Figure 2:
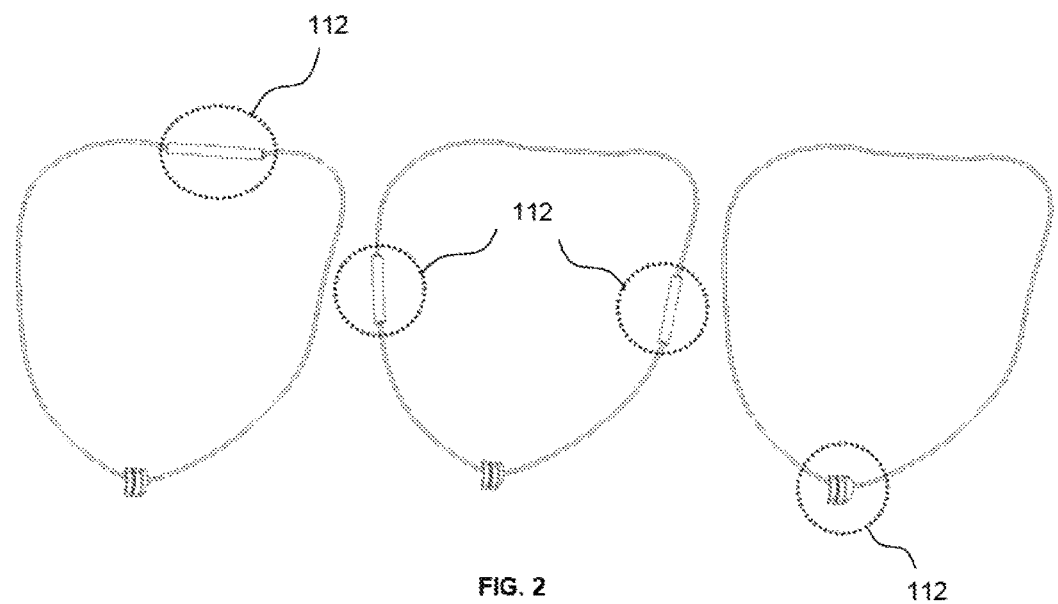
FIG. 2 show preferred modes of a battery pack that are configured: i) at the centre of a neck-band or neck-loop as one mode, or ii) to be spitted into two for better battery weight distribution as another mode, or iii) to be placed inside earpiece holder as a further option according to the preferred exemplary of the present invention.

The present invention relates to an apparatus for detachably engaging wireless headsets, and more particularly to detachably engage with individual wireless earpiece modules. Hereinafter, this specification will describe the present invention according to the preferred exemplary of the present invention. However, it is to be understood that limiting the description to the preferred exemplary of the invention is merely to facilitate discussion of the present invention and it is envisioned that those skilled in the art may devise various modifications and equivalents without departing from the scope of the appended claims.

In the preferred exemplary, the present invention is aimed to provide an apparatus for detachably engaging wireless headsets of various wearing modes such that the user can have various wearing styles to suit specific usage and preference. Accordingly, the apparatus for detachably engaging wireless headsets of the present invention also achieves an easy to access approach and solution by providing a neck-band or neck-loop type module for an easier and faster way to store or access the user's wireless earpiece modules. In particular, compared with the "truly" wireless stereo headsets currently available in market that come with charging cases, the neck-band or neck-loop type module of the present invention enables the user for easier and faster stow-away or access to the wireless earpiece modules of the detachable wireless headset. It should be note that the apparatus for detachably engaging wireless headsets of the present invention is still be able to maintain its function while charging. Unlike "truly" wireless stereo headsets currently available in market that come with a charging case and plugin cord for battery charging, the user is unable to access to the headset during charging mode in its charging case.

The above-mentioned objectives and effects of the apparatus for detachably engaging wireless headsets of the present invention can be achieved by the following technical approaches. The apparatus for detachably engaging wireless headsets according to the preferred mode of carrying out the present invention will now be described in accordance to the accompanying drawings FIGS. 1 to 7, either individually or in any combination thereof.

In the preferred exemplary of the present invention, the apparatus for detachably engaging wireless headsets (100) generally includes a neck-band or neck-loop module (110). Accordingly, the neck-band or neck-loop module (110) is collaboratively equipped with at least one battery pack (112), a built-in cable wire (114) and a pair of earpiece holders (116). It should be noted that the pair of earpiece holders (116) is adapted to be detachably engaged with a wireless earpiece module (120) which includes a pair of independent "truly" wireless earpiece modules (120) with built-in battery, speaker, microphone and other wireless-enabled components (see FIG. 1). It will be appreciated that the terms "wireless earpiece module (120)", "wireless earpiece modules (120)" and ""truly" wireless earpiece modules (120)" are referred to the same embodiment, as such they can be interchangeably used.

In the preferred exemplary, the battery pack (112) of the neck-band or neck-loop module (110) is configured to supply power to the wireless earpiece modules (120) via the earpiece holders (116). By way of example, but not limitation, the battery pack (112) may be configured in at least three preferred modes (see FIG. 2). Accordingly, the battery pack (112) may be configured at the centre of the neck-band or neck-loop as one mode, or to be spitted into two for better battery weight distribution as another mode, or to be placed inside the earpiece holders (116) as a further option. It will be appreciated that the neck-band or neck-loop module (110) is preferably, but not limited to, made of flexible cord with built-in cable wires (114) for connecting the pair of earpiece holders (116) with the at least one battery pack (112). The flexible cord with built-in cable wires (114) of the neck-band or neck-loop module (110), although an exemplary, will be used herein in describing the configurations and functions of the present invention. However other fashions, designs and/or configurations of the neck-band or neck-loop module (110) and its associated components or assemblies thereof are also contemplated. As such, the neck-band or neck-loop module (110) made-up by the flexible cord with built-in cable wires (114) should not be construed as limiting in any way.

Figure 3:
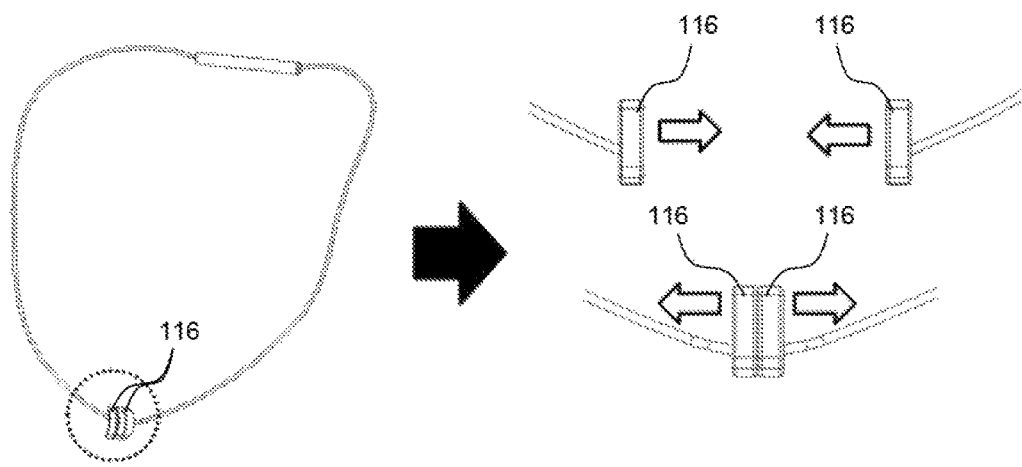
FIG. 3 shows a pair of earpiece holders of the neck-band or neck-loop module is adapted to be detachably engaged with each other by a locking feature according to preferred exemplary of the present invention.
Figure 4:
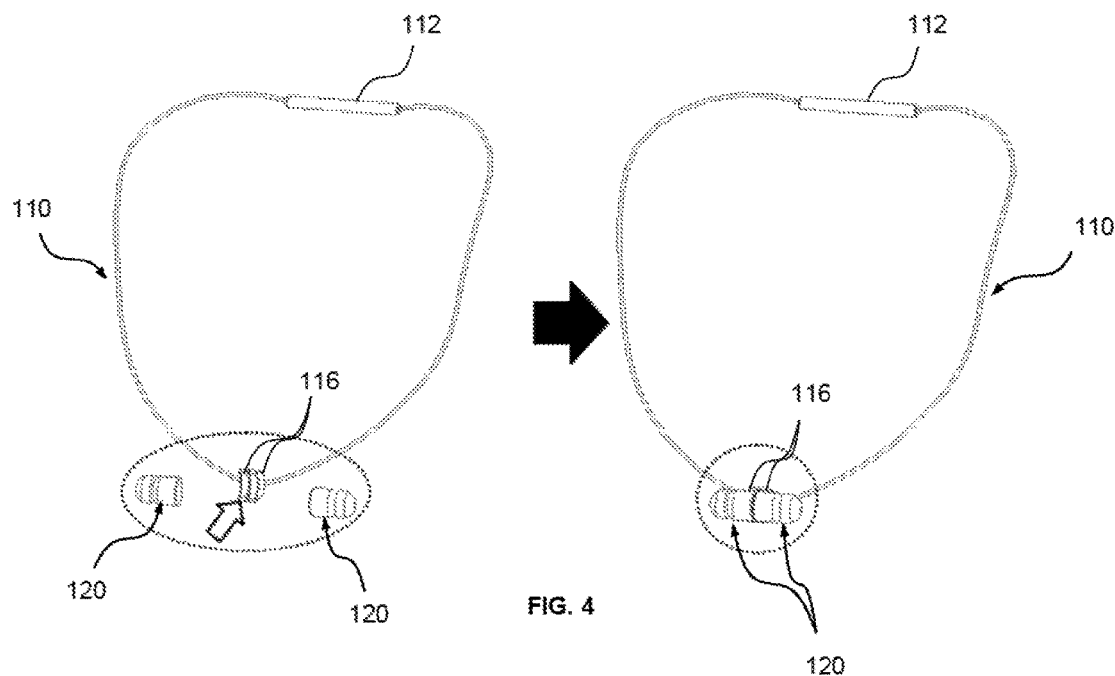
FIG. 4 shows a pair of wireless earpiece modules that are adapted to be detachably engaged with the earpiece holders of the neck-band or neck-loop module by a locking feature according to the preferred exemplary of the present invention.

By way of example but not limitation, each of the earpiece holders (116) is preferably disposed at distal ends of the neck-band or neck-loop module (110) (see FIG. 3). It should be noted that the pair of the earpiece holders (116) of the neck-band or neck-loop module (110) may be detachably engaged with each other by a locking feature, such as for example, but not limited to magnetic attraction, mechanical latches or connectors. It will be appreciated that detachable engagement of the earpiece holders (116) can be varied in any other forms depending upon the nature of application and/or usage requirements. Although the preferred exemplary deliberates the use of magnetic attraction, mechanical latches or connectors for detachable engagement, it should be understood that such detachable engagement is merely an exemplary, and various approaches or design configurations of the earpiece holders (116) may be altered in a manner so as to obtain desired optimal operating characteristics.

In the preferred exemplary of the present invention, the pair of "truly" wireless earpiece modules (120) is preferably an independent unit of left-hand and right-hand earpieces, such that data from a wireless-enabled device, for example, smart devices and media players, may be transmitted by radio frequency (RF) signals from the wireless-enabled device to the "truly" wireless earpiece modules (120). Accordingly, each "truly" wireless earpiece module (120) will have it's own wireless capabilities and power source. It will be appreciated that wireless protocols such as Wi-Fi, Bluetooth, or other protocols may be used for the wireless transmission. It should be noted that the pair of the "truly" wireless earpiece modules (120) is preferably configured to be detachably engaged with the earpiece holders (116) of the neck-band or neck-loop module (110) (see FIG. 4). Accordingly, the pair of "truly" wireless earpiece modules (120) are preferably used and that can be detachably engaged with the pair of earpiece holders (located at both ends of the neck-band or loop-band module) in order to have stereo performance. In the preferred exemplary, the pair of the "truly" wireless earpiece modules (120) may be detachably engaged with the pair of the earpiece holders (116) of the neck-band or neck-loop module (110) in a similar fashion, such as by a locking feature. By way of example, but not by the way of limitation, the locking feature can be in a form of magnetic attraction, mechanical latches or connectors. It will be appreciated that detachable engagement between the "truly" wireless earpiece modules (120) and the earpiece holders (116) can be varied in any other forms depending upon the nature of application and/or usage requirements. Although the preferred exemplary deliberates the use of magnetic attraction, mechanical latches or connectors for detachable engagement, it should be understood that such detachable engagement is merely an exemplary, and various approaches or design configurations of the detachable engagement between the "truly" wireless earpiece modules (120) and the earpiece holders (116) may be altered in a manner so as to obtain desired optimal operating characteristics.

It should be noted that the detachable engagement between the "truly" wireless earpiece modules (120) and the earpiece holders (116) not only facilitates the conveniency of stow-away and easy access, but also permits the wireless earpiece module (120) to be still functionable while charging. Accordingly, the charging of the wireless earpiece module (120) can be performed by the battery pack (112) configured at the neck-band or neck-loop module (110) such that the pair of "truly" wireless earpiece modules (120) can still be accessible and functionable as it is adapted to be charged via the detachable engagement with the earpiece holders (116) of the neck-band or neck-loop module (110). In other words, the detachable engagement of the pair of "truly" wireless earpiece modules (120) with the pair of the earpiece holders (116) is adapted to permit for an "on-the-go" charging of the wireless earpiece module (120). Accordingly, users of "truly" wireless stereo headsets who wish to secure their earpiece modules or to charge their earpiece modules can engage their earpiece modules with the earpiece holders to permit an ergonomic stow-away mode for ease of access as well as "on-the-go" charging of the earpiece modules. It will be appreciated that such "on-the-go" charging may be achieved by using other approaches, such as, for example but not limited to, the implementation of charging or pogo pins, inductive charging, male and female connectors or other appropriate detachable connections.

It should also be noted that the apparatus for detachably engaging wireless headsets (100) of the present invention may include at least two charging options. By way of example but not limitation, the apparatus for detachably engaging wireless headsets (100) may be recharged via a charging dock or directly through a power adaptor. Preferably, but not limited to, the power adaptor may be a USB or micro-USB (μUSB) power adaptor. Accordingly, the battery pack (112) of the neck-band or neck-loop module (110) is a rechargeable type such that the apparatus for detachably engaging wireless headsets (100) can be recharged via the charging dock or directly through the power adaptor.

Figure 5:
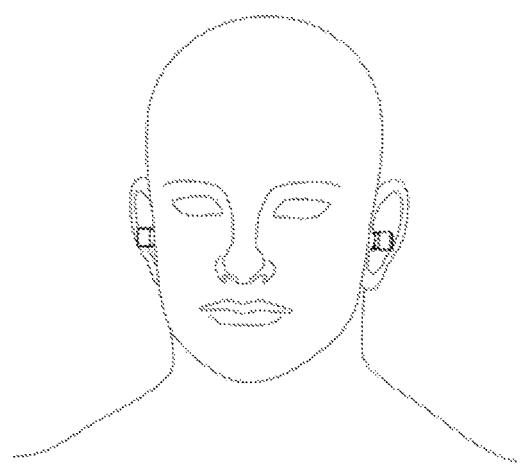
FIG. 5 shows the apparatus for detachably engaging wireless headsets that is fully charged, whereby the wireless earpiece modules are adapted to be independently, worn by the user without the neck-band or neck-loop module.
Figure 6:
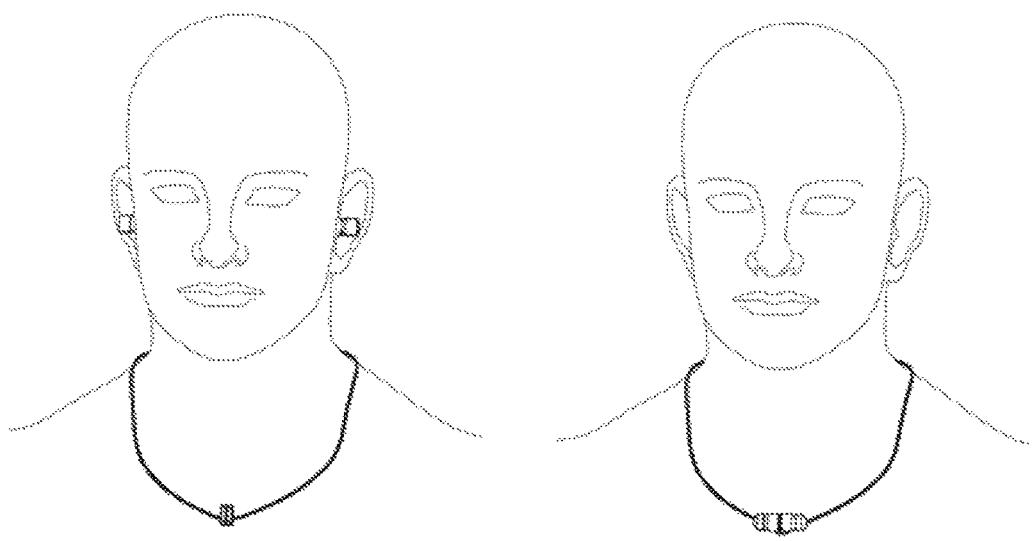
FIG. 6 shows the user can opt to wear the wireless earpiece module together with the neck-band or neck-loop module, either by attaching the wireless earpiece module to the earpiece holder of the neck-band or neck-loop module for conveniently stow-away or for the "on-the-go" battery charging purpose.
Figure 7:
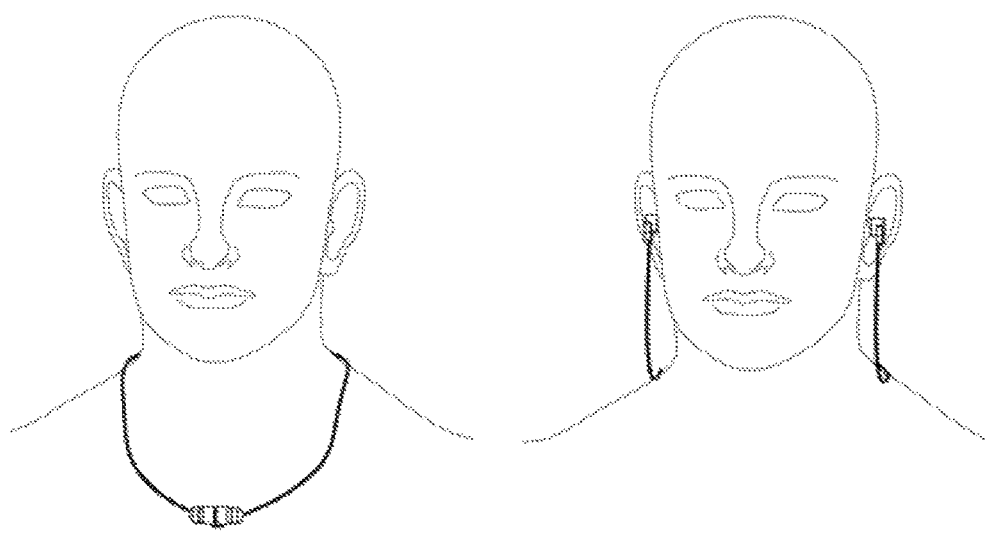
FIG. 7 shows user can further opt to attach the pair of earpiece holders of the neck-band or neck-loop module to one another to form a complete loop and can be worn as neck-band or neck-loop headset, so as the apparatus for detachably engaging wireless headsets can be worn by the user in a more secure fashion.

It will be appreciated that the apparatus for detachably engaging wireless headsets (100) of the present invention that has been fully charged is adapted to enable the user to just independently wear the wireless earpiece module (120) without the neck-band or neck-loop module (110) (see FIG. 5). This is particular useful when the user engages with sport activities or other outdoor extreme activities whereby they do not want any physical interference by the neck-band or neck-loop. It should be noted that the user may also wear the wireless earpiece module (120) together with the neck-band or neck-loop module (110) (see FIG. 6), either by attaching the wireless earpiece module (120) to the earpiece holder (116) of the neck-band or neck-loop module (110) for conveniently stow-away or for the "on-the-go" battery charging purpose. The user may opt for the further option of attaching the pair of earpiece holders (116) of the neck-band or neck-loop module (110) to one another to form a complete loop and to be worn as neck-band or neck-loop headset in a more secure fashion (see FIG. 7). Similarly, this allows the user still be able to use the apparatus for detachably engaging wireless headsets (100) when the wireless earpiece module (120) is being charged via the battery pack (112).

It should be noted that the configurations of various mechanical parts, components and/or elements used to carry out the above-mentioned embodiments are illustrative and exemplary only, and are not restrictive of the invention. One of ordinary skill in the art would recognize that those configurations, arrangements and variations used herein may be altered in a manner so as to obtain different optimal effects or desired operating characteristics. As such, the above-described should not be construed as limiting in any way, but as a best mode contemplated by the inventor for carrying out the invention.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention being thus described, it will be obvious that the same may be varied in many ways. Such variations are not to be regarded as a departure from the principle and scope of the invention, and all such modifications as would obvious to one skilled in the art intended to be included within the scope of following claims.

The invention claimed is:

1. An apparatus for detachably engaging wireless headsets (100), the apparatus includes:
   a) a neck-band or neck-loop module (110) with at least one battery pack (112);
   b) at least one earpiece holder (116);
   wherein the at least one earpiece holder (116) is adapted to be detachably engaged with at least one wireless earpiece module (120) to facilitate an user: i) to independently wear the wireless earpiece module (120) without the neck-band or neck-loop module (110); ii) to wear the wireless earpiece module (120) together with the neck-band or neck-loop module (110), either by attaching the wireless earpiece module (120) to the earpiece holder (116) for convenient stow-away or for the "on-the-go" battery charging purpose; iii) to attach the earpiece holder (116) to one another to form a complete loop and to be worn as neck-band or neck-loop headset; and
   wherein the at least one battery pack (112) of the neck-band or neck-loop module (110) is configured to supply power and to charge the at least one wireless earpiece module (120) via the at least one earpiece holder (116).

2. The apparatus according to claim 1, wherein the neck-band or neck-loop module (110) is made of flexible cord with built-in cable wires (114) for connecting the at least one earpiece holder (116) with the at least one battery pack (112).

3. The apparatus according to claim 1, wherein the at least one battery pack (112) is adapted to be configured in at least three preferred modes, that is: i) to be configured at the centre of the neck-band or neck-loop as one mode, or ii) to be spitted into two for better battery weight distribution as another mode, or iii) to be placed inside the at least one earpiece holder (116) as a further option.

4. The apparatus according to claim 1, wherein there is a pair of earpiece holders (116) that is preferably disposed at distal ends of the neck-band or neck-loop module (110).

5. The apparatus according to claim 4, wherein the pair of earpiece holders (116) can be detachably engaged with each other by a locking feature, such as by magnetic attraction, mechanical latches or connectors.

6. The apparatus according to claim 1, wherein the at least one wireless earpiece module (120) is detachably engaged with the at least one earpiece holder (116) by a locking feature, such as by magnetic attraction, mechanical latches or connectors.

7. The apparatus according to claim 1, wherein the at least one wireless earpiece module (120) includes at least one "truly" wireless earpiece module (120) with built-in battery, speaker, microphone and other wireless-enabled components.

8. The apparatus according to claim 1, wherein a charging of the at least one wireless earpiece module (120) is performed by the at least one battery pack (112) configured at the neck-band or neck-loop module (110) such that the at least one wireless earpiece module (120) can still be accessible and functionable as it is adapted to be charged via the detachable engagement with the at least one earpiece holder (116) of the neck-band or neck-loop module (110).

9. The apparatus according to claim 8, wherein the charging of the at least one wireless earpiece module (120) via the at least one earpiece holder (116) can be achieved by various approaches, such as the implementation of charging or pogo pins, inductive charging, male and female connectors or other appropriate detachably connections.

10. The apparatus according to claim 1, wherein there is a pair of wireless earpiece modules (120) adapted to be detachably engaged with a pair of earpiece holders (116) and each wireless earpiece module (120) is an independent unit of left-hand and right-hand earpiece, such that data from a wireless-enabled device can be transmitted by radio frequency (RF) signals from the wireless-enabled device to the wireless earpiece module (120).

11. The apparatus according to claim 10, wherein the wireless radio frequency (RF) transmission includes wireless protocols such as Wi-Fi, Bluetooth, or other protocols adapted for wireless transmission.

12. The apparatus according to claim 1, wherein the battery pack (112) of the neck-band or neck-loop module (110) is a rechargeable type such that the apparatus for detachably engaging wireless headsets (100) can be recharged via a charging dock or directly through a power adaptor.

\* \* \* \* \*